Nov. 21, 1961  A. C. EVANS  3,010,067
DUAL ELECTRICAL INSTRUMENT
Filed March 9, 1959  3 Sheets-Sheet 1

ALFRED C. EVANS
INVENTOR.

BY Rudolph J. Junick
ATTORNEY

Nov. 21, 1961  A. C. EVANS  3,010,067
DUAL ELECTRICAL INSTRUMENT
Filed March 9, 1959  3 Sheets-Sheet 2

ALFRED C. EVANS
INVENTOR.

BY Rudolph J. Junick
ATTORNEY

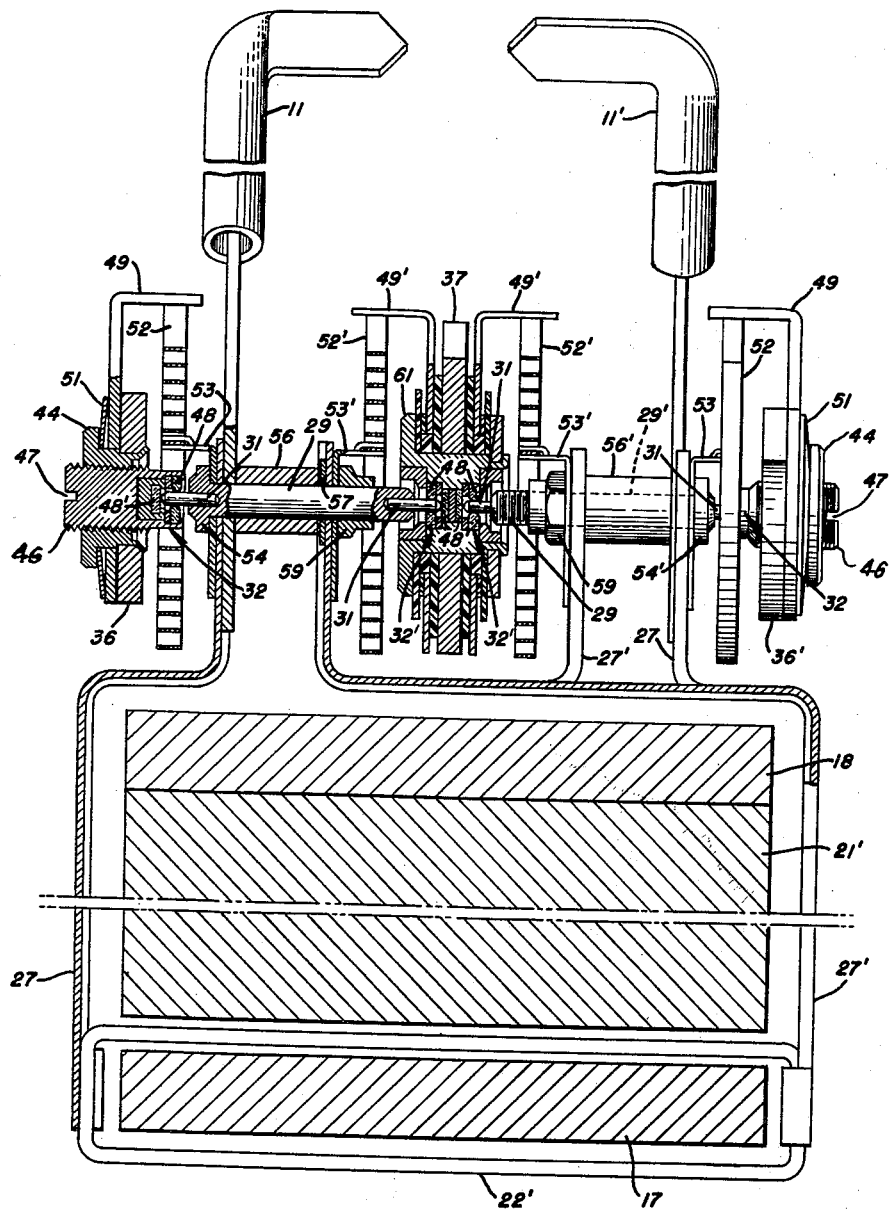

3,010,067
Patented Nov. 21, 1961

3,010,067
DUAL ELECTRICAL INSTRUMENT
Alfred C. Evans, Cranford, N.J., assignor to Daystrom Incorporated, Murray Hill, N.J., a corporation of New Jersey
Filed Mar. 9, 1959, Ser. No. 798,017
8 Claims. (Cl. 324—114)

This invention relates to dual electrical instruments in which two independently movable coil and pointer systems are provided, and particularly to dual high torque mechanisms in which the overall instrument height is substantially the same as that of a single mechanism instrument of comparable torque.

Small, compact and lightweight instruments are particularly desirable for use in aircraft for the measurement of numerous electrical quantities. Often, a display of both actual and command information by separate pointer systems along a common scale is desired. With prior art arrangements, two individual and independent instrument mechanisms have been employed for such displays, whereby the overall height of the arrangement is twice that of a single instrument. With the dual instrument of my invention, the overall height thereof is substantially the same as that of a single prior art mechanism, yet, the moving coil dimensions and effective magnetic structure are such that a high torque is obtained by each of the dual mechanisms.

An object of this invention is the provision of a dual electrical instrument which is compact, sensitive, and of a small size.

An object of this invention is the provision of a dual electrical instrument having two independent movable coil and pointer systems and a magnetic system which includes a pair of magnets, the individual mechanisms functioning as single air gap instruments.

An object of this invention is the provision of a dual self-shielding, electrical instrument which includes a pair of magnets enclosed by a soft iron yoke which shields the magnets from external magnetic fields.

These and other objects and advantages will become apparent from the following description when taken with the accompanying drawings. It will be understood that the drawings are for purposes of illustration and are not to be construed as defining the scope or limits of the invention, reference being had for the latter purpose to the appended claims.

In the drawings wherein like reference characters denote like parts in the several views:

FIGURE 5 is a sectional view taken essentially on line 5—5 of FIGURE 2.

Figure 1:
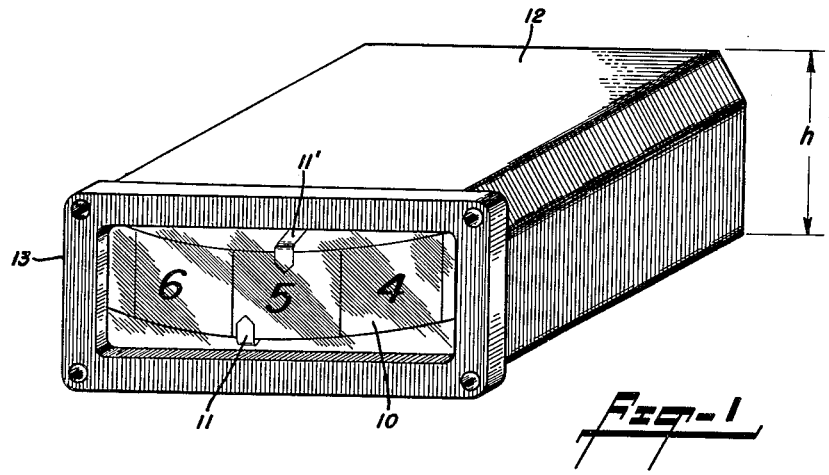
FIGURE 1 is an isometric view of a dual electrical instrument enclosed in a case.

Reference is first made to FIGURE 1 of the drawings wherein there is shown a dual electrical instrument having an arcuate scale plate 10 over which a pair of pointers 11 and 11' are adapted to move. Since the pointers are actuated by independently movable coil systems, it will be understood that different scale markings could be provided for each pointer. In the illustrated embodiment, however, the pointers cooperate with a single set of scale plate markings on the scale plate, each pointer being movable over the entire scale range.

The dual instrument mechanism is shown mounted within a suitable housing 12 having a flange 13 adjacent the opening in the front thereof for use in mounting the instrument on a panel, or the like. With my novel dual instrument mechanism, the overall height of the case, designated "$h$," in FIGURE 1, is substantially the same as the height of a single instrument case, with substantially the same torque for each of the instrument mechanisms as exhibited by the said single instrument mechanism.

Reference is now made to FIGURES 2-5 of the drawings wherein the elements of a dual electrical instrument embodying my invention are shown. The instrument comprises a magnetic structure assembly including a two part soft-iron yoke 16 comprising a semi-cyclindrical shaped portion 17 and a cap portion 18 formed in a V-shape intermediate the ends, as viewed in FIGURE 2, and which are secured together by bolts 20. The yoke assembly encloses a pair of magnets 21 and 21' (which are identical in construction but provided with different reference characters for purposes of identification) having like polarity polar surfaces suitably secured to the inner walls of the inclined V-shaped portion of the cap portion of the yoke 16. Magnetic flux gaps are formed between the inner surface of the semi-cylindrical shaped portion 17 of the yoke and the arcuate-shaped free ends of like polarity polar surfaces of the magnets 21 and 21', within which one side of individually movable coils 22 and 22' operate. The opposite side of the coils 22 and 22' operate outside of the yoke portion 17 and produce no rotational torque with current flow through the coil. It will be noted, then, that as mentioned above, each instrument mechanism of the dual instrument is of the type referred to as a single air gap instrument mechanism wherein the entire magnetic energy of the permanent magnets are each concentrated in single flux gaps having an arcuate length slightly longer than the angular deflection range of the pointers 11 and 11'.

Figure 3:
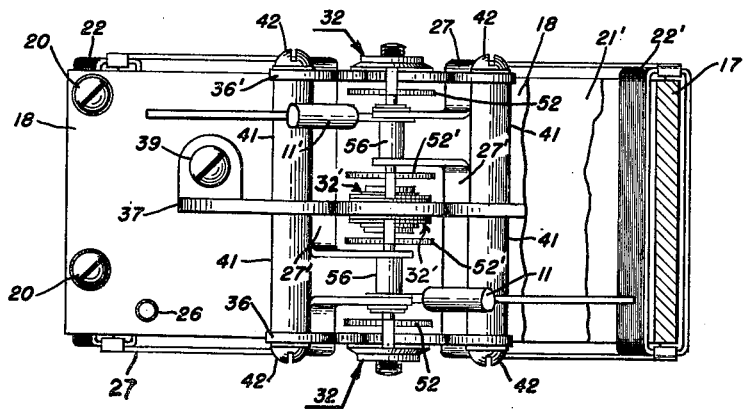
FIGURE 3 is a plan view of the instrument mechanism with parts broken away for clarity.
Figure 2:
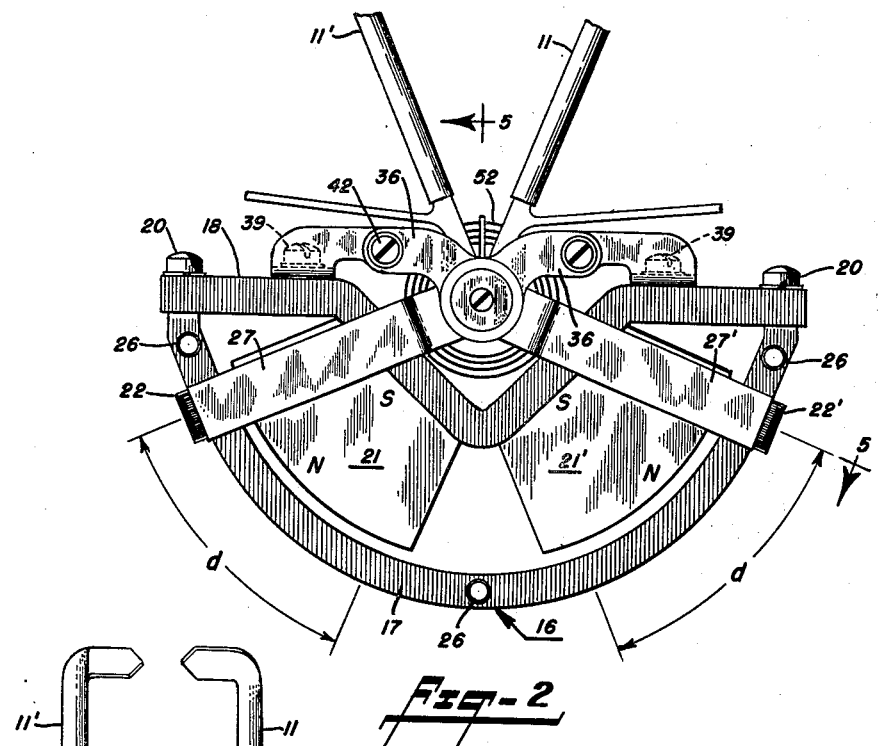
FIGURE 2 is a side elevational view of the essential elements of a dual electrical instrument embodying my invention.

The yoke 16 may be provided with a plurality of threaded mounting holes 26, as seen in FIGURES 2 and 3, for receiving bolts, or the like (not shown), for holding the yoke in place on a base (not shown) that forms a part of the instrument case, or housing, 12 shown in FIGURE 1.

Figure 4:
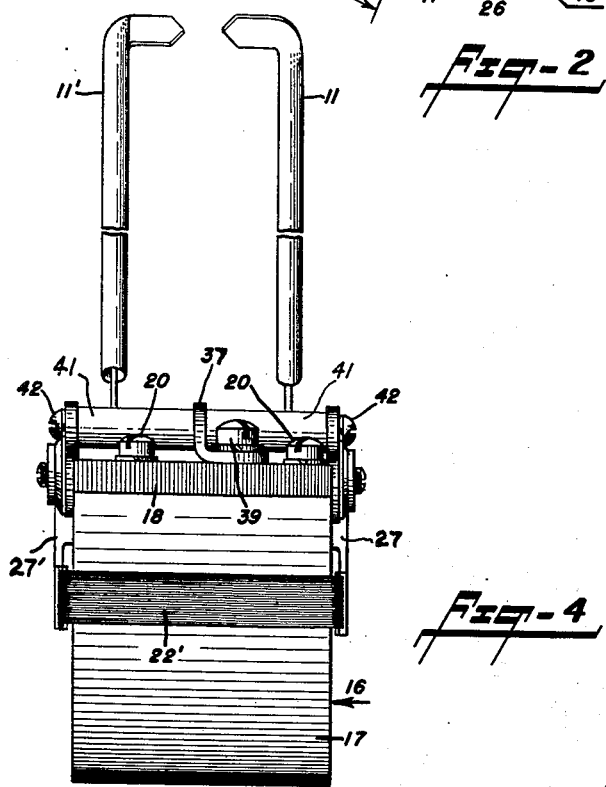
FIGURE 4 is an end view of the instrument mechanism.

The movable coils 22 and 22' are each supported by a pair of flanged brackets or channel members 27, 27' having parallel extending arm portions which are secured to staffs 29, 29 (see FIGURE 5). Aligned pivots 31, 31 are carried by each staff, which pivots operate in end ring bearing assemblies 32 carried by top or upper, and bottom or lower bridges 36 and 36', respectively, and center ring bearing assemblies 32' carried by a center bridge 37. The center bridge 37, as best seen in FIGURES 2-4, is secured by tap bolts 39 to the yoke portion 18, and arches downwardly midway between the ends thereof in the direction of the V-shape formed in the upper yoke portion 18. The top and bottom bridges 36 and 36', respectively, are attached to posts 41 (as best seen in FIGURES 3 and 4) extending from each face of the center bridge 37 and secured thereto by screws 42.

As best seen in FIGURE 5, the top and bottom ring bearing assemblies 32 are carried by internally threaded hubs 44 staked to the top and bottom bridges 36 and 36'. The assemblies comprise externally threaded cylinders 46, each having a kerf or slot 47 in the outer end thereof, which threadedly engage the hubs 44, and support ring and end jewels 48 and 48', respectively, of the said bearing assemblies (only the details of the top bearing assembly being shown in FIGURE 5).

Spring abutments 49 are positioned on the hubs 44 between washer members 51 and the bridges 36 and 36'. The outer ends of spiral springs 52 are secured to the spring abutments 49, while the inner ends thereof are secured to inner spring abutments 53. The inner spring abutments 53 are mounted on the pivotal staffs 29 adjacent radial flanges 54 formed at the outer ends thereof. One arm of each of the coil brackets 27 is positioned adjacent the abutments 53. Tubular spacers 56 and insulating washers 57 separate the parallel arms of the brackets 27 and 27' for each of the pivotal mechanisms. It will be noted that the inner ends of the pointers 11 and 11' fit within the channel portion of the coil brackets 27 forming secure connections therewith.

The inner threaded ends of the staffs 29 carry inner spring abutments, designated 53', positioned between the brackets 27' and nuts 59 threaded to the said staffs. The said inner spring abutments are secured to the inner ends of spiral springs, designated 52'. The outer ends of the springs 52' are attached to spring abutments 49' which are supported between suitable insulating members on the center bridge 37. A center hub 61 stakes the abutments 49' and associated insulating members to the center bridge. In addition, the center hub 61 carries the center ring bearing assemblies 32' within the aperture formed therethrough. As mentioned above, the ring bearing assemblies 32' are of conventional design and include the usual ring and end jewels 48 and 48' for support of the pivots 31. Electrical connection may be made to the coils 22 and 22' through the spiral springs 52 and 52' and the attached abutments in a manner well understood by those skilled in this art. In the illustrated embodiment, the abutments 49 are grounded while the abutments 49' are insulatedly supported and suitably connected, by means not shown, to the coils 22 and 22'.

From the foregoing description, it will be seen that I provide a novel dual mechanism arrangement on which a pair of independently movable coils are pivotally mounted on coaxial rotational axes. The coils 22 and 22', in the illustrated embodiment, are each adapted for pivotable movement through a deflection angle "d," as illustrated in FIGURE 2, of 45 degrees. In FIGURE 2, the coil 22 and attached pointer 11 are shown in an extreme clockwise rotational position while the coil 22' and associated pointer 11' are shown in an extreme counter-clockwise rotational position. For movement over the same scale range, the pointers 11 and 11' diverge at an angle of 45 degrees when the coils are in the illustrated positions. The relatively long pointers 11 and 11' are of sufficient weight to balance the respective moving coils 22 and 22'.

Although the illustrated air gaps for the coils 22 and 22' are uniform in the radial dimension thereby providing for uniform flux densities therein and uniform deflection characteristics for each mechanism, those skilled in this art will understand that the air gaps may be made non-uniform to obtain desired scale characteristics. Further, as mentioned above, each pointer may operate over individual scales, if desired.

With my novel arrangement, it will be noted that the magnets 21 and 21' are of maximum size extending from the front to the rear of the yoke structure, thereby resulting in an efficient magnet design which produces a high magnetic flux across the air gap. Also, this construction of the magnetic circuit permits the use of a movable coil having a relatively long side operative within the flux gap and wherein the the effective portion of the movable coil is disposed at a substantial distance from the rotational axis. This results in a high torque mechanism. Hence, the torque of each of the instrument mechanisms is equal to that of prior art single instrument mechanisms of substantially the same height. Each mechanism develops a high torque capable of easily deflecting a 4½ inch pointer over a relatively flat scale with good ballistic characteristics.

Having now described my invention in detail in accordance with the patent statutes, various changes and modifications will suggest themselves to those skilled in this art, and it is intended that such changes and modifications shall fall within the spirit and scope of the invention as recited in the following claims.

I claim:

1. A magnetic structure for a dual electrical instrument comprising a yoke having an arcuate-shaped portion and forming an enclosure, and first and second permanent magnets lying in a common plane having opposed polar surfaces, the polar surfaces of like polarity of the said magnets abutting the said yoke at the inner surface thereof, the other like porarity polar surfaces of the magnets being spaced from the inner surface of the yoke to form arcuate flux gaps therewith, which flux gaps lie along a common circle having a radius coinciding with the line of intersection formed by planes passing through the magnetic axis of each magnet.

2. The invention as recited in claim 1 wherein the said yoke comprises a substantially semi-cylindrical shaped member and a cap member formed with a V-shaped portion extending into the said semi-cylindrical shaped member and closing the ends thereof, the said magnets being attached to the walls of the V-shaped portion of the cap member of the yoke.

3. A magnetic structure for a dual electrical instrument comprising a yoke having a substantially semi-cylindrical shaped portion closed by a base portion having a V-shaped midsection which extends into the said semi-cylindrical shaped portion, first and second permanent magnets lying in a common plane having opposed polar surfaces one of which is flat and the other curved convexly, the flat polar surfaces being of like polarity and abutting the yoke at the said V-shaped midsection, the other polarity curved polar surfaces of the said magnets being spaced from the said inner surface of the semi-cylindrical shaped portion of the yoke and forming arcuate magnetic flux gaps therebetween, the arrangement being such that the flux gaps lie along a common circle having a radius coinciding with the line of intersection formed by planes passing through the magnetic axis of each magnet.

4. A dual electrical instrument mechanism comprising a yoke including an arcuate-shaped portion and forming an enclosure, first and second permanent magnets lying in a common plane and having opposed polar surfaces, the one like polarity surfaces of the said magnets abutting the said yoke at the inner surface thereof, the other like polarity polar surfaces of the magnets being spaced from the inner surface of the yoke to form a pair of arcuate flux gaps therewith, and a pair of coils each having a side passing through the respective flux gaps, the said coils being pivotably mounted to move through the flux gaps about a common axis of rotation.

5. The invention as recited in claim 4 wherein the said coils encircle the arcuate portion of the yoke.

6. The invention as recited in claim 4 including a center bridge secured to the yoke and top and bottom bridges secured to the center bridge, a pair of channel members connected to each of the said coils, the pair of channel members attached to one of the said coils being pivotably mounted between the top and center bridges, and the pair of channel members attached to the other of the said coils being pivotably mounted between the center and bottom bridges, the pivot axes of the channel members being arranged coaxially.

7. A dual electrical instrument mechanism comprising a yoke having a semi-cylindrical shaped member closed by a cap member having a V-shaped portion formed therein which extends into the said semi-cylindrical member, first and second permanent magnets lying in a common plane and having opposed polar surfaces one of which is flat and the other convexly curved, the flat polar surfaces being of like polarity and abutting the yoke at the V-shaped portion of the cap member, the other polarity curved polar surfaces of the magnets being spaced from the said inner surface of the said semi-cylindrical shaped member of the yoke and forming first and second arcuate magnetic flux gaps therebetween, first and second coils each having an inner leg passing through the respective first and second magnetic flux gaps and having their outer legs outside the said yoke, and means rotatably mounting the said coils about coaxial pivot axes adjacent the V-shaped portion of the cap member, the said first and second coils being movable in the respective first and second magnetic flux gaps through substantially equal angles of rotation.

8. The invention as recited in claim 7 wherein the last-mentioned means comprises a center bridge mounted on the said cap member and extending transversely thereof intermediate the top and bottom thereof, top and bottom bridges mounted on the said center bridge and extending substantially parallel therewith adjacent the top and bottom of the yoke, coil brackets secured to each of the said coils, the said coil brackets for the first coil being pivotably mounted between the top and center bridges and the said coil brackets for the second coil being pivotably mounted between the center and bottom bridges.

References Cited in the file of this patent

UNITED STATES PATENTS

| | | |
|---|---|---|
| 644,859 | Hoyt | Mar. 6, 1900 |
| 2,183,934 | Heiland | Dec. 19, 1939 |
| 2,455,167 | Gilbert | Nov. 30, 1948 |
| 2,539,143 | Knudsen | Jan. 23, 1951 |
| 2,840,782 | Ammon | June 24, 1958 |
| 2,875,410 | Lamb | Feb. 24, 1959 |